United States Patent
Kristić et al.

(10) Patent No.: US 10,165,597 B2
(45) Date of Patent: Dec. 25, 2018

(54) DEVICES USING SELF-ADAPTING MEDIUM ACCESS CONTROL PROTOCOL

(71) Applicant: Sveučilište u Splitu, Fakultet elektrotehnike,strojarstva i brodogradnje, Split (HR)

(72) Inventors: Ante Kristić, Podstrana (HR); Ivan Kedžo, Split (HR); Julije Ožegović, Split (HR)

(73) Assignee: Sveuciliste U Splitu, Fakultet Elektrotehnike, Strojarstva I Brodogradnje, Split (HR)

( * ) Notice: Subject to any disclaimer, the term of this patent is extended or adjusted under 35 U.S.C. 154(b) by 143 days.

(21) Appl. No.: 15/124,989

(22) PCT Filed: Mar. 9, 2015

(86) PCT No.: PCT/HR2015/000006
§ 371 (c)(1),
(2) Date: Sep. 9, 2016

(87) PCT Pub. No.: WO2015/136316
PCT Pub. Date: Sep. 17, 2015

(65) Prior Publication Data
US 2017/0027000 A1 Jan. 26, 2017

(30) Foreign Application Priority Data
Mar. 10, 2014 (HR) .............................. P 20140220 A

(51) Int. Cl.
*H04W 74/08* (2009.01)
*H04L 12/801* (2013.01)
(Continued)

(52) U.S. Cl.
CPC ... *H04W 74/0816* (2013.01); *H04W 72/0446* (2013.01)

(58) Field of Classification Search
CPC ....................... H04W 74/0816; H04W 72/0446
See application file for complete search history.

(56) References Cited

U.S. PATENT DOCUMENTS

| 2008/0002734 | A1* | 1/2008 | Zheng | H04B 7/2606 370/445 |
| 2013/0301649 | A1 | 11/2013 | Vijayasankar et al. | |
| 2014/0010081 | A1* | 1/2014 | Benveniste | H04L 47/10 370/230 |

OTHER PUBLICATIONS

Kuppa, S. and R. Prakash, Adaptive IEEE 802.11 DCF scheme with knowledge-base backoff, IEEE New Orleans, LA (USA), Mar. 2005, pp. 63-68.

(Continued)

*Primary Examiner* — Kiet Tang
(74) *Attorney, Agent, or Firm* — Tedc Whitlock

(57) ABSTRACT

In wireless communication networks with distributed medium access control, maximal network throughput is achieved as a compromise between medium contention duration and collision rate. Maximal throughput in self-adapting medium access protocol is achieved by stations maintaining backoff counter BC and freezing counter FC, which define the state in two-dimensional state space. Countdown process is comprised of decrementing BC in idle timeslots, and incrementing FC in busy timeslots. Countdown ends if the value of BC reaches zero, when the station starts to transmit data, or when FC is incremented to be greater than freezing limit FL. In both cases, the station has to randomly select new backoff counter, reset its freezing counter, and continue to count down with these new values of BC and FC. At the end of countdown, the station calculates contention measure CM=a*BC+b*FC, and based on set of CM thresholds CMi, activates one of available contention windows Wi that define the interval of available values for the random selection of new backoff counter [Wi$_{min}$, Wi$_{max}$]. In loaded network, the station can increase the total amount of backoff time to be greater than the maximal upper limit of available contention windows by selecting new backoff counter multiple times, which is made possible by limiting countdown freezing. This manifests the self-adaptive nature of the described medium access control (Continued)

Figure 1:
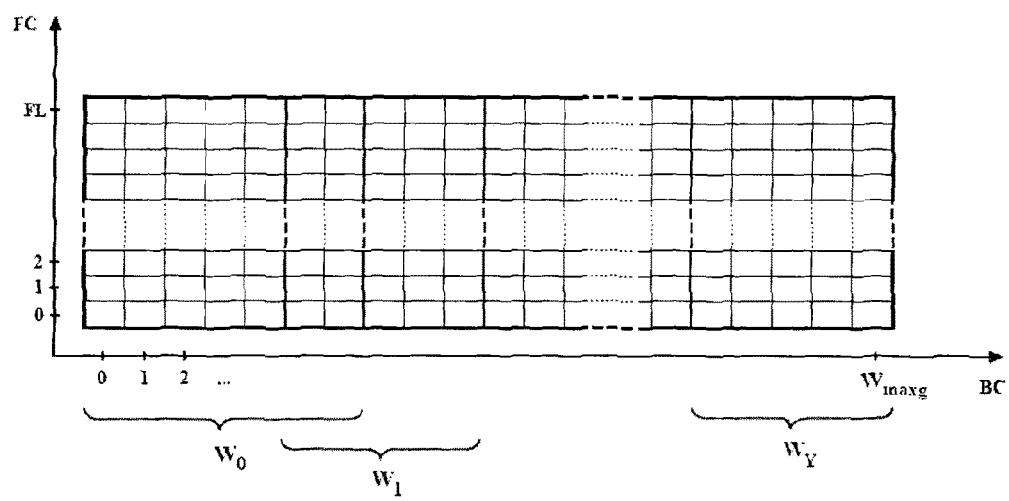

protocol. The self-adaptive nature is also manifested in selection of contention window based on contention measure of the previous countdown, which additionally regulates medium contention duration, achieving good network throughput in various network load scenarios.

5 Claims, 3 Drawing Sheets

(51) Int. Cl.
    *H04B 7/26*     (2006.01)
    *H04W 72/04*     (2009.01)

(56) References Cited

OTHER PUBLICATIONS

Abdelhamid Nafaa, Adlen Ksentini, and Ahmed Mehaoua, Sliding Contention Window (SCW): Towards Backoff Range-Based Service Differentiation over IEEE 802.11 Wireless LAN Networks, IEEE Network Jul./Aug. 2005, vol. 19, No. 4, pp. 45-51.

Miguel Elias M. Campista, Luis Henrique M.K. Costa and Otto Carlos MB Duarte, Improving the Data Transmission Throughput over the Home Electrical Wiring, Proceedings of the IEEE Conference on Local Computer Networks 30th Anniversary (LCN'05), Sydney, Australia, Nov. 2005, pp. 318-327.

Ante Kristic, Julije Ozegovic and Ivan Kedzo, Mathematical Model of Simplified Constrained Priority Countdown Freezing Protocol, IEEE Symposium on Computeers and Communications (ISCC), IEEE, Jul. 7, 2013, pp. 729-734.

Katsumi Sakakibara and Jumpei Taketsugu, A New IEEE 802.11 DCF Utilizing Freezing Experiences in Backoff Interval and Its Saturation Throughput, Journal of Communications and Networks, Feb. 2010, pp. 43-51, vol. 12 No. 1.

International Search Report (ISR) in WO 2015/136316.
Written Opinion of the ISA in WO 2015/136316.
International Preliminary Report on Patentability in WO 2015/136316.

* cited by examiner

DEVICES USING SELF-ADAPTING MEDIUM ACCESS CONTROL PROTOCOL

1. FIELD OF THE INVENTION

The invention relates to the devices using distributed access control to the wireless medium in wireless computer and telecommunication networks, and according to the international patent classification (IPC) it is classified as H04L 12/413—Data switching networks—Bus networks—with decentralized control—with random access.

2. TECHNICAL PROBLEM

Modern wireless computer and communication networks make use of the statistical multiplexing of information using distributed medium access mechanisms with medium contention. It is attempted to achieve maximal medium throughput as a compromise between collision rate and medium contention duration.

If the number of collisions is great, a large percentage of time, and consequently of medium capacity, is being wasted. If the collision rate is smaller, the wasted capacity also decreases. However, in distributed (asynchronous) system, the reduction of collision rate can be achieved by increasing the medium contention duration only. Longer contention will itself use a large percentage of time, and consequently of medium capacity. That is the reason why it is necessary to achieve the optimal contention duration, and collision rate, which result in maximal medium throughput.

Achieving maximal medium throughput as a compromise between collision rate and contention duration usually requires the information about the number of stations that are currently competing for the medium. In practice, this information is unavailable, and can only be roughly estimated. Local information about the medium available to the particular station is based on previous contentions and can largely deviate from the state in the current contention. Thus, it is important to develop medium contention protocols that can effectively use the incomplete information available, and achieve the nearly optimal medium throughput.

The development of medium access control protocols is particularly important considering the future growth of local wireless communications, where great increase of wireless devices density is expected, both in mobile communication networks and in sensor networks.

3. CURRANT STATE OF THE TECHNIQUE

Wireless medium is in its essence bus-like medium, where at any particular time only one station can transmit data. If two or more stations are transmitting, collision occurs. Over such medium, various logical topologies are organized (mesh, star, considering the data flow) and different medium access mechanisms are used (centralized, distributed, considering medium access control). Networks using distributed medium access control, where the stations compete for the medium access, are of interest.

Medium contention in distributed access control is based on different waiting times after the last transmission. The stations randomly choose the waiting time, whereby the station that chooses the shortest waiting time wins the medium. If two stations have the same waiting time, they will start the transmission at the same time and cause a collision. Maximal medium throughput is achieved with optimal ratio between contention duration and collision rate. Longer contention duration decreases the probability that two stations choose the same waiting time and cause collision, while shorter duration reduces the contention overhead, but also increases collision probability.

Modern local area wireless computer networks are based on the set of standards IEEE 802.11, which define two basic medium access mechanisms on MAC (Medium Access Control) layer: DCF (Distributed Coordination Function) and PCF (Point Coordination Function). PCF is intended for use in centralized infrastructure networks, where the central station (Access Point—AP) cyclically polls other stations allowing them to transmit data. DCF is the basic MAC function in 802.11 networks, used in both infrastructure and ad-hoc networks, and it is based on CSMA/CA (CSMA with Collision Avoidance).

In distributed mode, a station can transmit data only if it has sensed idle medium. In other case, the station generates a random number from the interval [0, W−1], defers from transmission and continues to sense the medium. The parameter W is called contention window (sometimes denoted as CW), and generated random number is called Backoff counter (BC). When the station detects that the current transmission is over, it starts the countdown of the chosen BC. According to the DCF, the time is divided in timeslots (TS). In each TS after DIFS (DCF Interframe Space) when the medium is idle, the station decrements its BC by one. If the medium becomes busy, the station freezes the countdown process, which is continued after the medium becomes idle again. The station wins the medium access (i.e. wins the medium contention) when its BC is decremented to zero. Therefore, the current value of BC represents the priority of the station, where the stations with lower BC values have higher priority and the parameter W defines the set of available priorities.

Naturally, it is beneficial that the stations have different values of backoff counter BC, i.e. different priorities. Otherwise, the stations with the same value of BC would count down to zero in the same timeslot and start to transmit, resulting in collision. Therefore, if the parameter W was too small, the stations would often have the same priorities, and collisions would often occur. On the other hand, if the contention window was too big, the stations would spend too much time competing for the medium, i.e. stations would decrement their backoff counters too long. Hence, 802.11 DCF transmitter updates its contention window after each transmission. If the transmission was successful, the contention window is reset to initial value $W_{min}$. Alternatively, after unsuccessful transmission the contention window is doubled until it reaches the maximal value $W_{max}$. These values are $W_{min}=32$ and $W_{max}=1024$ in 802.11b standard. Doubling of contention window after collision and its resetting after a successful transmission is called Binary Exponential Backoff (BEB) algorithm.

DCF protocol is used because of its simplicity and robustness. Its basic advantage is in using of collision as indication of network load, but it is also its main disadvantage, since it is reactive, i.e. it reacts only after the collision has occurred. The other shortcoming of DCF is that it achieves good throughput only if the number of active stations is relatively small. In the highly congested network, which is often becoming the case, standard DCF cannot achieve the optimal network throughput.

Enhancements of DCF should provide better throughput by proactively controlling the stations' waiting time, regardless of the number of active stations in the network.

4. DISCLOSURE OF THE INVENTION

The goal of the invention is to address the problem of throughput in distributed wireless networks where the stations compete for the medium access. Novelty of the invention is in usage of two state variables and two or more contention windows, of which at least one is basic window starting from zero, while others are shifted contention windows starting with $W_{min}>0$. The station can freeze its BC countdown process only a limited number of times and, considering the state in which it wins or loses medium contention, it randomly chooses new BC from one of basic or shifted contention windows. In networks with small load, the stations will usually choose random values from basic contention window, which will result with high throughput when the number of active stations is small. In networks with high load, the station will choose backoff counter from shifted windows, often multiple times without winning the medium. This will in self-adapting manner enable achieving high throughput when the number of active stations is large. The novelty of the invention is particularly reflected in the use of contention window adjustment algorithm after medium contention loss.

Devices using self-adapting medium access control protocol use local information about the state of the medium contained in two finite variables that form two-dimensional finite state space. These variables are backoff counter and freezing counter.

Backoff counter BC contains information about the remaining countdown time after the selection of a random number from the current contention window. BC is decremented by one in each idle timeslot, and this countdown process is frozen if some other station starts to transmit (loss of contention). When BC reaches the value zero, the station wins the medium and starts transmission. The greater value of BC means that the station will spend more time in countdown process and will have to freeze countdown more times.

Freezing counter FC contains the information about the number of times that the medium contention has been lost (and BC countdown frozen) since the last random selection of backoff counter. FC is incremented by one after each medium contention loss. The greater value of freezing counter means that the station has frozen countdown more times, i.e., that other active stations have won the medium more times since the last selection of random BC.

Finite value of freezing counter FC means that the station can freeze countdown process only a finite number of times. After reaching maximal value of FC, freezing limit FL, in the next contention loss the station has to randomly select new BC from a certain contention window and reset its FC to zero. The freezing limit FL can be constant (independent of BC) or it can be a function of BC.

Figure 2:
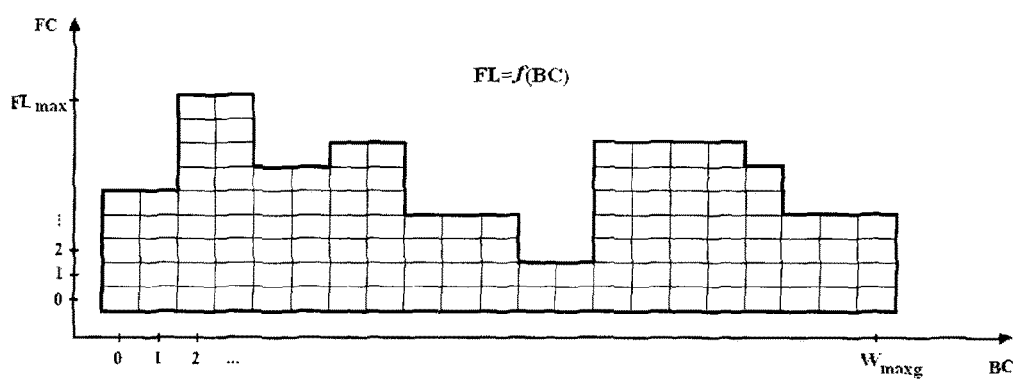

FIG. 1 shows two-dimensional state space defined by coordinates BC and FC. The examples of the basic and shifted contention windows are labeled on the BC axis. It contains values $[0, W_{maxg}]$, that is from zero to the maximal upper limit among all contention windows. These are the states (BC, 0) which the station takes after selection of new BC and reset of FC to zero. This can happen after a contention loss or after transmitting data. Only one freezing limit, common for all BC values, is labeled on FC axis. FC axis contains values $[0, FL_{max}]$, that is from zero to maximal freezing counter value. FIG. 1 represents the case where the parameter FL is constant, while FIG. 2 shows general case, where the value of FL is a function of BC. This function can be arbitrarily defined.

Figure 3:
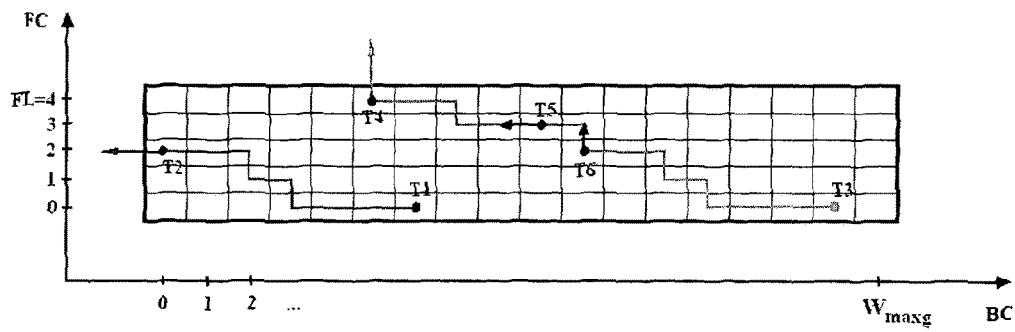

Devices using self-adapting medium access control protocol traverse through the described state space in each contention cycle. State transition is characterized by two processes: decrementing of BC in idle TS and incrementing of FC in busy TS. The limits of these processes are BC=0, when the station starts to transmit data, and FC=FL, when the station has to randomly select new BC if it loses another contention, without ending the countdown of current BC. In FIGS. 3, T5 and T6 represent these basic transitions. T5 represents the case when timeslot is idle, so the station decrements its BC and transits from the state (BC, FC) to the state (BC−1, FC). T6 represents the case when timeslot is busy, i.e. when the station loses the medium contention, so it freezes the countdown and increments its FC, transiting from the state (BC, FC) to the state (BC, FC+1). Station's trajectory through the state space depends on the medium state. In FIG. 3, the example of trajectory when station wins the medium in one of states (0, FC) is shown, from T1 to T2. The example of trajectory when the station loses the contention in one of states (BC, FL) is also shown, from T3 to T4. The station wins the medium contention (state T2) in one of states (0, FC) and by selection new backoff counter and resetting freezing counter transits to the state (BC, 0). The station that loses the medium in the state ($BC_{old}$, FL) also has to select new BC and reset FC, transiting to the state ($BC_{new}$, 0).

Devices using self-adapting medium access control protocol furthermore use contention measure CM as a weight of contention cycle, defined as weighted sum of current values of backoff counter and freezing counter. Contention measure for the state (BC, FC) is CM=a*BC+b*FC, where a and b are weighting factors. In reality, these are the states in which the station wins (0, FC), where it is CM=0+b*FC, and states when the station cannot increment FC because of freezing limit FL, where it is CM=a*BC+b*FL. CM parameter can be filtered by averaging using appropriate number of previous values.

Figure 4:
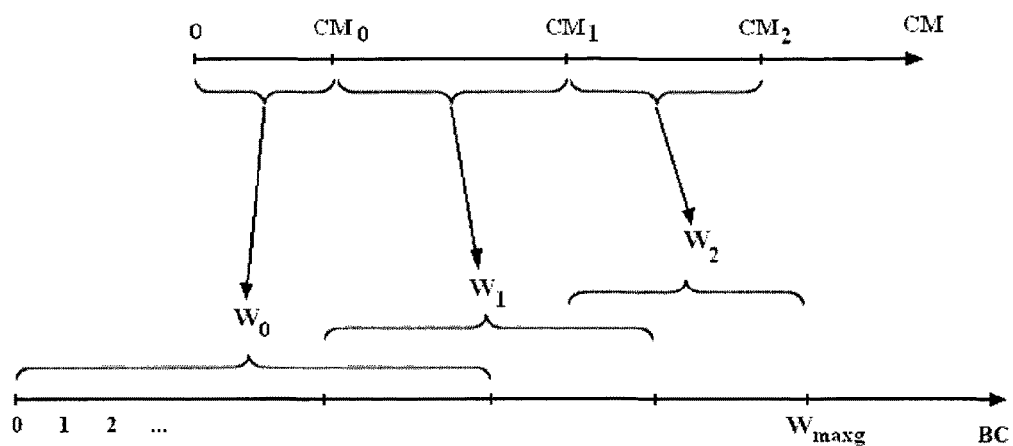

Contention measure CM is used for selection of contention window. Lower value of CM means that the station often decremented its BC and rarely incremented FC, indicating that the medium is not highly loaded. In this case it is optimal to use the basic contention window for selection of BC, or a window with smaller shift from zero. Greater value of CM means that the station rarely counted down and often froze countdown process, indicating higher level of contention for the medium. In such case, it is optimal to use contention window with greater shift. The set of contention measure thresholds CMi is assigned to the set of contention windows Wi, indexed with i=[0, Y], where i=0 is assigned to the basic window, and shift of window from zero increases with the increase of index. The station selects window Wi if the calculated CM is such that CMi−1<CM<=CMi. Exception is the basic window W0, which is selected if it holds that 0<=CM<=CM0. FIG. 4 shows process of contention window selection based on CM value when Y=2.

Figure 5:
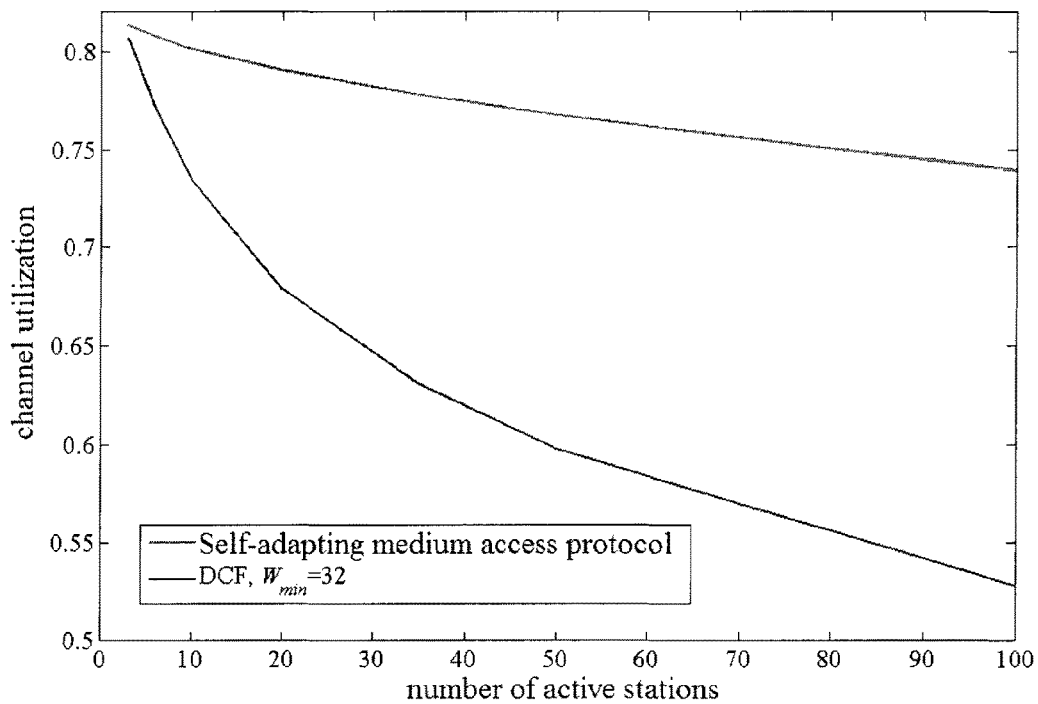

In loaded network, the station can increase the total amount of backoff time to be greater than the maximal upper limit of available contention windows by selecting new backoff counter multiple times, which is made possible by limiting countdown freezing. This manifests the self-adaptive nature of the described medium access control protocol. The self-adaptive nature is also manifested in selection of contention window based on contention measure of the previous countdown, which additionally regulates medium contention duration, achieving good network throughput in various network load scenarios. FIG. 5 compares network throughput of self-adapting protocol where FL=2, Y=1, W0=[0,32], W1=[24,88] and throughput of DCF with $W_{mm}$=32 and $W_{max}$=1024. Network throughput is shown as a function of number of active stations in the network and expressed as a share of 6 Mb/s channel bandwidth, and the size of MAC frame is 1040 bytes. It is obvious that self-adapting protocol achieves higher throughput than DCF when the number of active stations is great.

Figure 6:
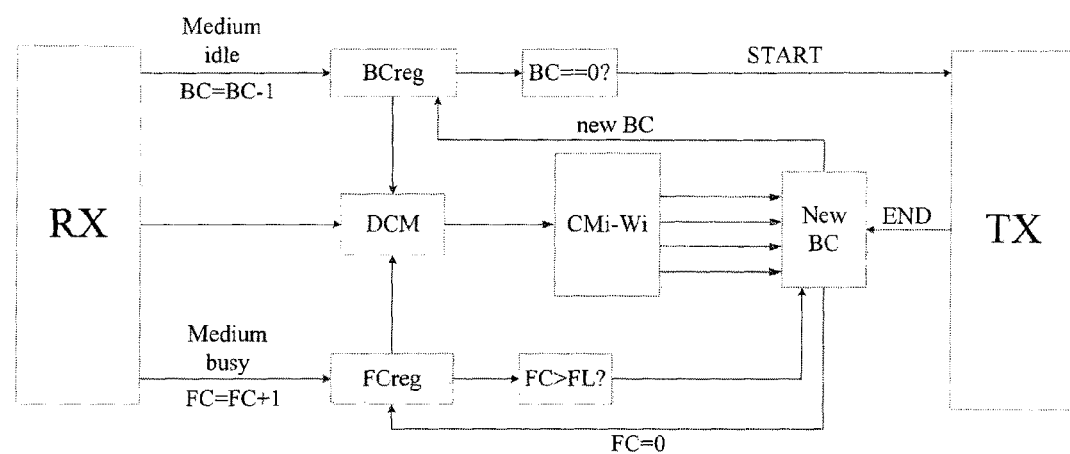

Devices using self-adapting medium access control protocol use modules according to FIG. 6. Backoff counter BC and freezing counter FC determine the state of the station in two-dimensional state space. Receiver RX senses state of the medium in timeslot TS. In idle TS, BC is decremented by one, and in busy TS FC is incremented by one. Zero detector BC=0 detects that BC equals 0, and initiates data transmission, and freezing limit detector detects excessive contention loss. In both cases, with or without transmitting data, the station selects new Random Backoff Counter RBC. In doing so, contention measure CM is calculated and used with selector CMi for selecting one of contention windows Wi. Set of available values for the new RBC is limited by thresholds of the selected contention window.

5. BRIEF DESCRIPTION OF DRAWINGS

FIGS. 1-6 are used for better description and understanding of the invention. FIG. 6 shows the basic structure of the devices using self-adapting medium access protocol.

FIG. 1—Two-dimensional state space BC, FC with constant value of FL;

FIG. 2—Two-dimensional state space BC, FC with arbitrary value of FL;

FIG. 3—The basic state transitions and examples of trajectories through state space;

FIG. 4—Contention window selection mechanism;

FIG. 5—Comparison of network throughput for DCF and self-adapting protocol;

FIG. 6—Block diagram of the device using self-adapting medium access protocol.

6. DESCRIPTION OF THE INVENTION REALIZATION

Since the invention is intended for use in devices (wireless stations) based on computers, the invention realization is possible by implementing described mechanisms in devices' firmware.

7. APPLICATION OF THE INVENTION

The invention is used for construction of communication network made of devices using self-adapting medium access protocol.

8. ACRONYMS

FC—freezing counter value
BC—backoff counter value
$W_0$—basic contention window
$W_1$, $W_Y$—shifted contention windows
FL—maximal value of freezing counter FC, as a function of backoff counter BC
$FL_{max}$—maximal value of the freezing limit parameter
$W_{maxg}$—maximal upper limit among all available contention windows
CM—Contention measure
$CM_0$, $CM_1$, $CM_2$—contention measure thresholds used in contention window selection RX-device's receiver
TX—device's transmitter
$BC_{reg}$—register used for storing backoff counter value
$FC_{reg}$—register used for storing freezing counter value
BC=0?—detector of condition BC=0
FC>FL?—detector of condition FC>FL
DCM—detector of contention measure value
CMi-Wi—part of the device used for selection of contention window in accordance with CM parameter value
New BC—random backoff counter selector

The invention claimed is:

1. A wireless computer using self-adapting medium access control protocol, characterized by:
    set of contention windows (Wi), of which at least one starts from zero and at least one is shifted from zero;
    detector of contention measure parameter (DCM) and contention window selector (CMi);
    backoff counter (BC) and freezing counter (FC);
    detectors of final values BC=0 and FC>freezing limit (FL);
    selector of random backoff counter (RBC); and
    further characterized by the detector of contention measure parameter (DCM) that calculates at the end of backoff counting the contention measure (CM) as the weighted sum CM=a*BC+b*FC, where a and b are weighting factors used to define the contribution of BC (weighting factor a) and FC (weighting factor b) values in calculation of weighted sum CM, and where the said weighted sum CM is used by contention window selector (CMi) for selecting one of available windows by comparing the calculated value CM with the predefined borders CMi, so that the contention window (Wi) is selected when CMi−1<=CM<CMi, regardless whether the previous backoff counting was ended by winning or losing the medium.

2. The wireless computer of claim 1, further characterized by the backoff counter BC and the freezing counter FC that determine the state of the station in two-dimensional state space by decrementing of BC in idle timeslot and incrementing of FC in busy timeslot, and detectors of final values BC=0 and FC>FL detect the end of backoff counting by detecting the condition BC=0, when the station wins the medium access, or the condition FC>FL, when the station ends the backoff counting by losing the medium.

3. The wireless computer of claim 1, further characterized by the freezing limit FL that can be constant or can be a function of backoff counter BC.

4. The wireless computer of claim 1, further characterized by the selected contention window Wi that determines at the end of backoff counting the upper and lower limits $Wi_{min}$ and $Wi_{max}$ for selector of random backoff counter RBC, and the selected random value is used for initialization of backoff counter BC, while the freezing counter FC is reset to zero.

5. A communication network comprising two or more wireless computers of claim 1 using self-adapting medium access control protocol.

* * * * *